United States Patent [19]

Bahu

[11] 4,350,070

[45] Sep. 21, 1982

[54] ELECTRONIC MUSIC BOOK

[76] Inventor: Sohail E. Bahu, 50509 Hollyhock Rd., South Bend, Ind. 46637

[21] Appl. No.: 238,005

[22] Filed: Feb. 25, 1981

[51] Int. Cl.³ .................. G09B 15/02; G10H 1/40
[52] U.S. Cl. ............................ 84/1.03; 84/477 R; 84/478; 84/DIG. 12
[58] Field of Search ............... 84/1.03, 462, 464 R, 84/464 A, 470 R, 470 P, 471 R, 472, 477 R, 478, 483 R, 483 A, 484, 327, 329, DIG. 12

[56] References Cited

U.S. PATENT DOCUMENTS 4,281,579 8/1981 Bennett, Sr. ...................... 84/478
4,297,934 11/1981 Imamura et al. .................. 84/1.03

*Primary Examiner*—Stanley J. Witkowski
*Attorney, Agent, or Firm*—M. A. Hobbs

[57] ABSTRACT

An electronic music book for simplifying the storage and retrieval of musical scores in which a control panel operates electronic memories to locate a song in the memory for a musician's reading thereof. Optional modules may be added to the memory to expand the library of songs stored by the book. A variety of additional features may be included in the music book, such as audio playback of a selected song, tempo and rhythm control, and a temporary memory for musical works entered through a musical keyboard in the control panel. The book is adapted to be attached to a music stand and may be battery operated for portable use or permanently connected to a source of A.C. voltage.

11 Claims, 5 Drawing Figures

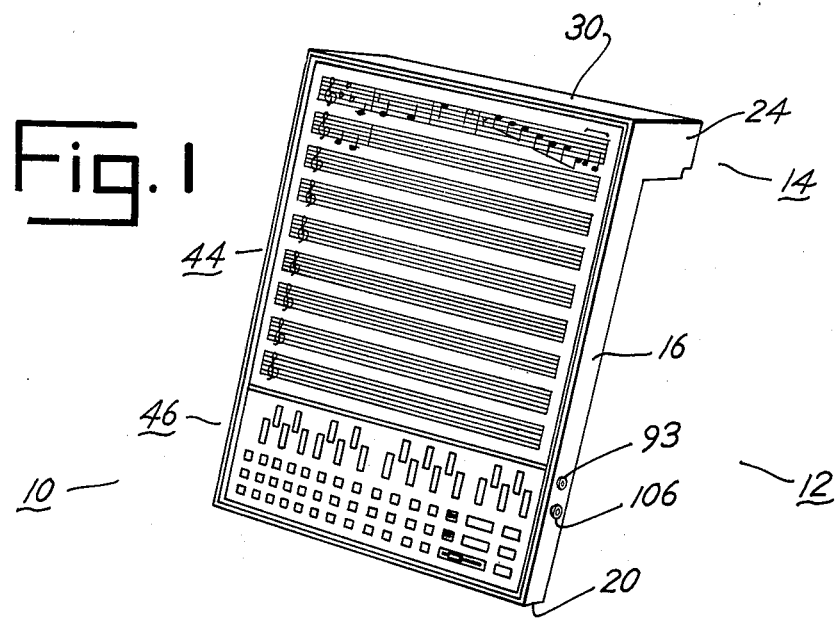
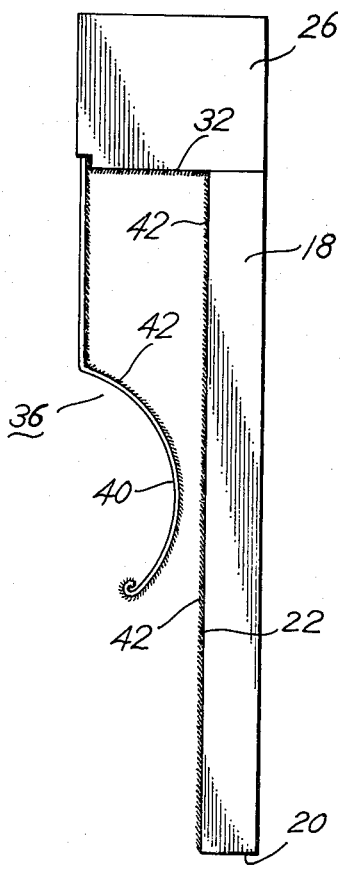
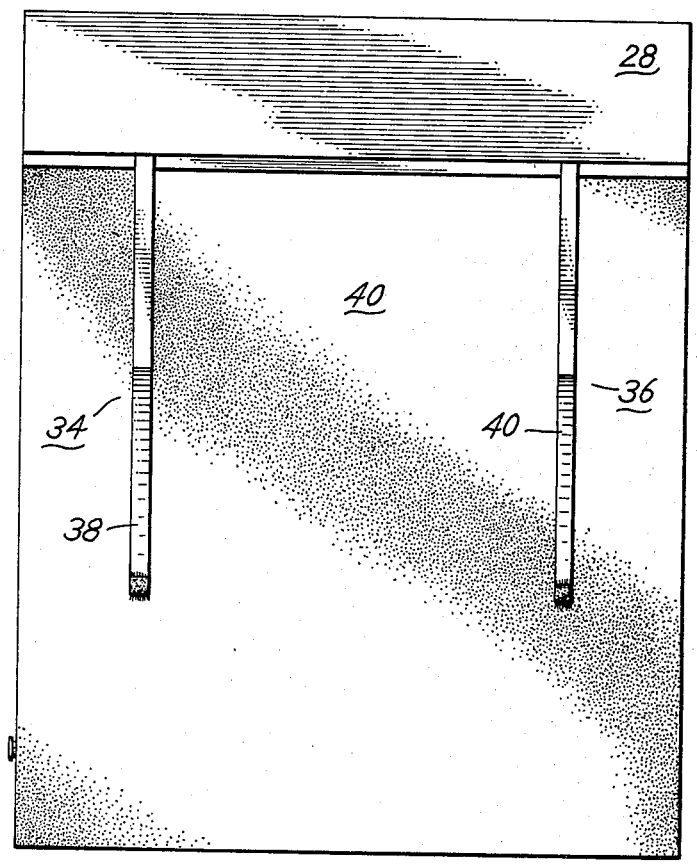

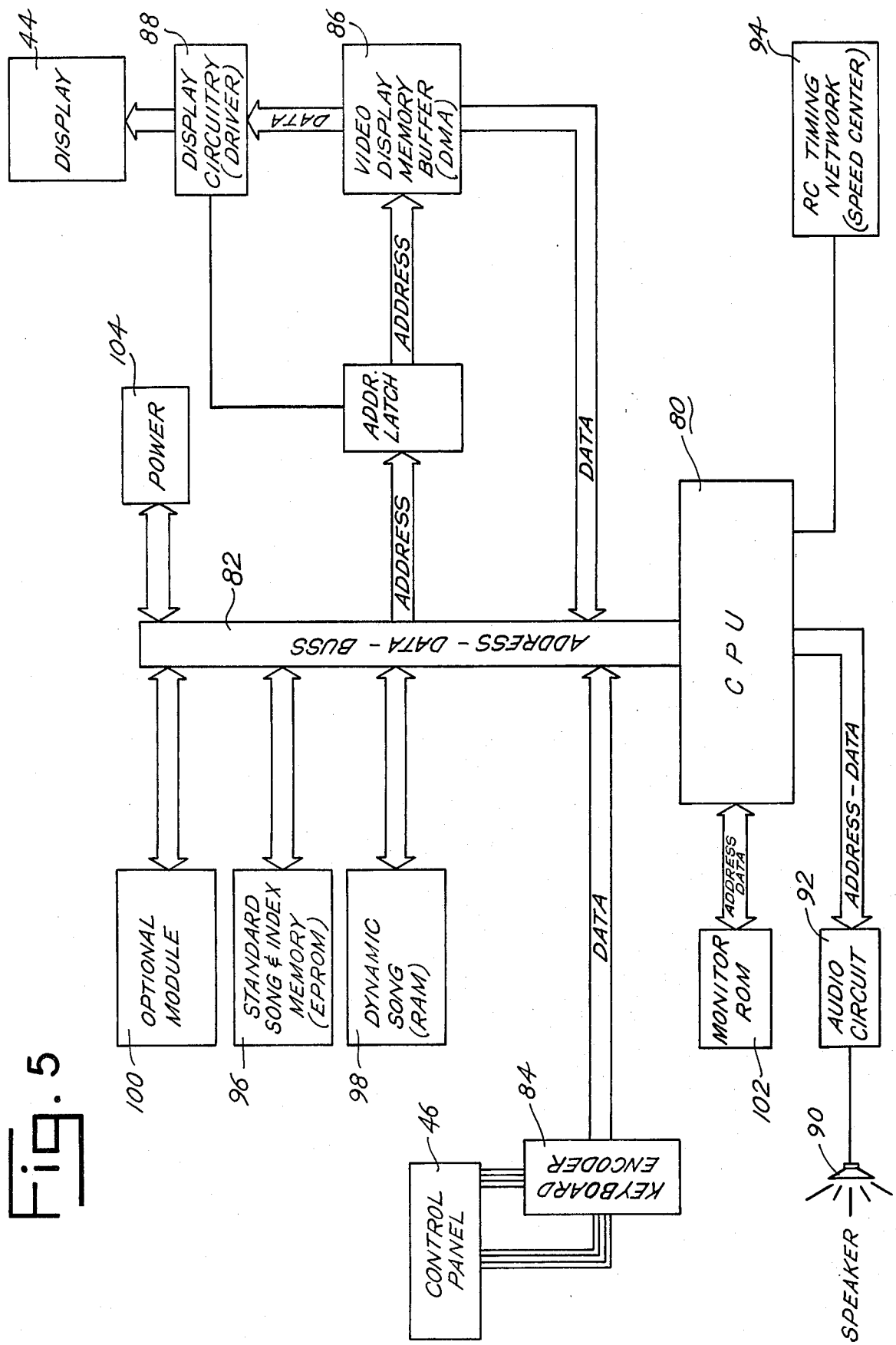

ELECTRONIC MUSIC BOOK

BACKGROUND OF THE INVENTION

The convenient storage and handling of written music has long presented a problem for the professional and amateur musician alike. Full musical arrangements of songs can be obtained in sheet music form, in which each song is printed on paper and arranged similarly to a pamphlet and may be purchased individually. When a large number of musical works have been obtained individually in sheet music form, it becomes difficult to store the music in a neat and orderly manner which will minimize damage to the paper sheets. A further difficulty is encountered with collections of sheet music arrangements in locating a desired arrangement when the collection is large and all of the sheet music is stored together. The musician must devise and keep current his own indexing system to locate a song, or else he must page through the songs, scanning the titles, until the desired song is located. A further and not insignificant disadvantage associated with the use of sheet music is the cost thereof. A musician who obtains songs as the sheet music arrangements thereof are released will encounter a substantial continuing expense if he purchases more than just a few of the current releases.

As an alternative to the purchase of full, individual musical arrangements of songs in sheet music form, many musicians prefer to purchase compilations of a number of songs in a book. These music books, often called fake music books because of the abbreviated arrangements published therein, contain tens or even hundreds of songs, and are substantially less expensive than purchasing individual copies of the songs. The music can be stored more easily, with potentially less damage, in that the hard or the reinforced soft cover bindings used on the books reduce the potential for tearing the music sheets. Locating a desired song is somewhat less cumbersome with music books than with sheet music in that, rather than paging through a large stack of individual songs of sheet music and scanning the titles thereof, the musician need only check the index of various books until the desired song is located. However, this too can be time consuming, particularly when the desired song is not well-known and the collection of music books is extensive.

Further disadvantages exist in collecting compiled musical works in book form. Frequently a music book, particularly one with a large number of different songs, will have a substantial number of songs which the purchaser does not desire to play. It is not uncommon that a musician will purchase a music book having 100 or more songs, while knowing that he will regularly play only ten or fifteen of the songs contained therein. Many popular songs are published in a large number of compiled works, and the musician may have the same or similar arrangements of a song in several different books. Thus, the storage problem encountered with fake music books becomes one of space, since the musician has to store duplicates of desired songs in addition to a large number of undesired musical arrangements.

SUMMARY OF THE INVENTION

It is therefore one of the principal objects of the present invention to provide an electronic music book which enables a musician to store written musical arrangements for songs in a neat and orderly manner that minimizes the potential for damage to the stored arrangements, which enables the musician to quickly locate a desired song, and which stores the musical arrangements in substantially less space than is required for storing the same arrangements as sheet music or music in book form.

Another object of the present invention is to provide an electronic music book which will assist the musician in learning new songs by electronically playing at least a portion of the song, thereby enabling the musician to hear the song before or after he has played it, and which will provide background rhythms for songs at variable tempos controlled by the musician.

A further object of the present invention is to provide an electronic music book which will record and temporarily retain a musician's original composition, thereby enabling the musician to play the music without the interruption of having to write the notes down, and which will replay the musician's original composition so that he may critically evaluate the quality thereof.

These and other objects are achieved in the present invention by providing an electronic music book having electronically coded and stored musical arrangements and a video screen on which the arrangements appear when selected. A keyboard on the music book enables the musician to recall an index of available songs from the memory of the book, and from that list to select the proper code for recalling a particular song. Interchangeable modules may be added to the music book to increase the size of the library of songs available to the musician. An automatic playback feature may be included for playing all, or a portion, of the song electronically so that the musician can hear the song and compare his playing thereof with the recorded version. Electronically played rhythms may also be included in the music book, as well as a temporary memory feature for recording the musician's original compositions. The speed of the playback may be adjusted through a speed control component. The electronic music book may be operated on direct current or alternating current for portable or permanent use and installation.

Additional objects and advantages of the present invention will become apparent from the following detailed description and the accompanying drawings.

BRIEF DESCRIPTION OF THE DRAWINGS

FIG. 1 is a perspective view of an electronic music book embodying the present invention displaying a song;

FIG. 2 is a side elevational view of the electronic music book shown in FIG. 1;

FIG. 3 is a plan view of the back of the electronic music book;

FIG. 5 is a schematic drawing of the components in the electronic music book.

DETAILED DESCRIPTION OF THE PREFERRED EMBODIMENT

Figure 4:
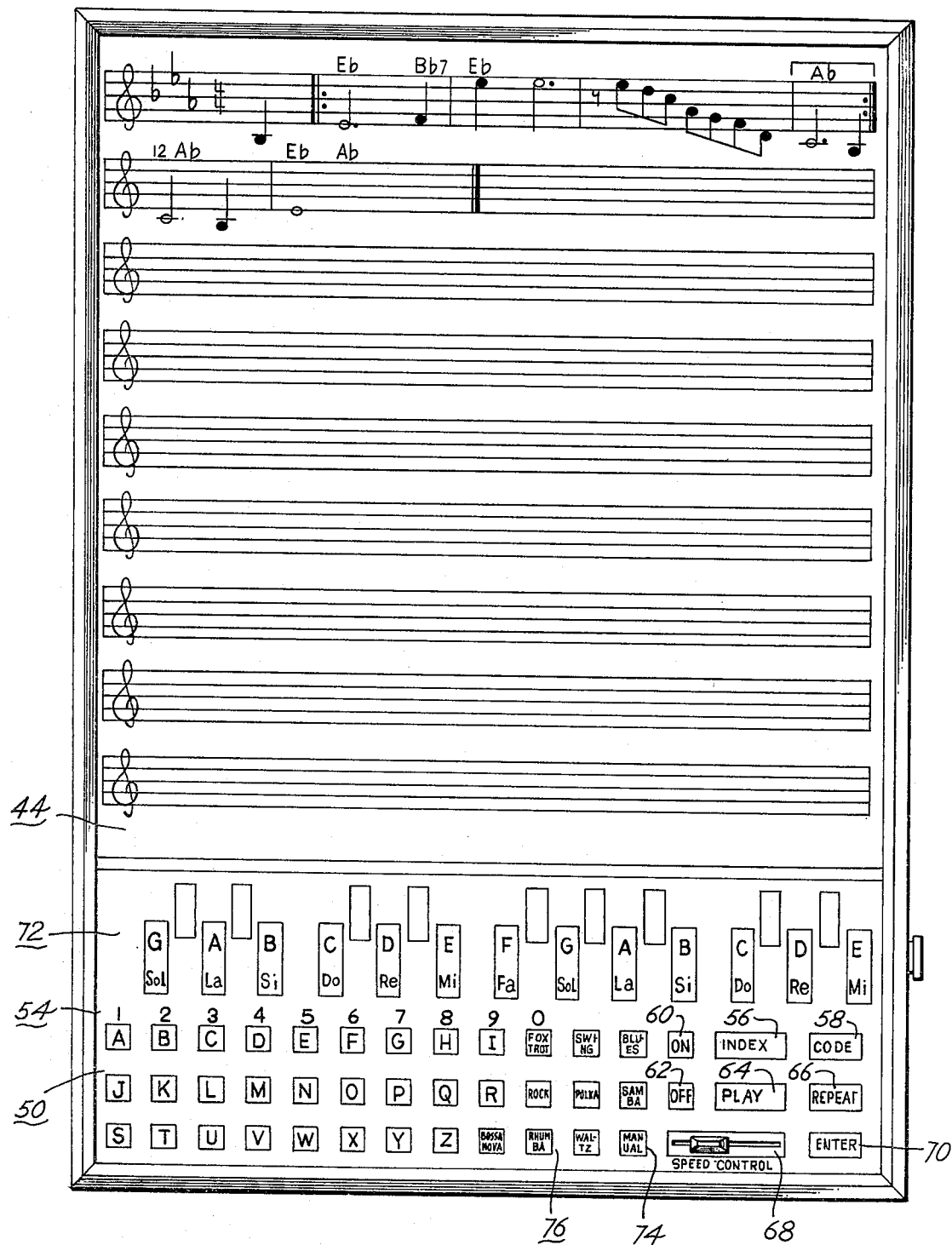
FIG. 4 is a plan view of the front of the electronic music book showing a portion of a song being projected on the screen thereof.

Referring now more specifically to the drawings, and to FIGS. 1, 2, and 3 in particular, numeral 10 designates an electronic music book embodying the present invention, which may be used by pianists, organists or any musician who would use conventional sheet music or a music book of compiled works while playing a song. The electronic music book enables the musician to quickly locate a song, and the book will store the written music in substantially less space than the storage of printed paper requires.

Electronic music book 10 includes a housing having a relatively thin lower portion 12 and a slightly thicker upper portion 14 in which many of the electronic components to be described subsequently are housed. The lower portion of the housing includes side walls 16 and 18, a bottom 20 and a back 22 between the side walls from bottom 20 to the top of the side walls. Upper portion 14 is flush with the front of lower portion 12 and includes side walls 24 and 26, a back 28, a top 30 and a bottom 32. Hooks 34 and 36 extend downwardly from near back 28 of upper portion 14 and have curved portions 38 and 40 which angle inwardly toward back 22 of lower portion 12. Hooks 34 and 36 function as spring clips, so that electronic music book 10 can be hooked to a free standing music stand or to a fixed music stand such as the music stand on a piano, organ or the like. The music book is hooked to the back rest of the stand, with the back rest being disposed between back 22 and hooks 34 and 36. To prevent the electronic music book from scratching or otherwise marring the music stand to which it is attached, a layer of padding such as felt, foam rubber or the like is disposed on the surfaces of back 22, bottom 32 and clips 34 and 36 which may come in contact with the music stand.

The front of electronic music book 10 includes a viewing screen 44 on which the song to be played or the indexing information used to obtain a song is projected. In FIGS. 1 and 4 portions of songs are shown projected on viewing screen 44. The lower portion of the front of electronic music book 10 has a control panel 46 which includes the buttons and switches operated thereby for selecting among the various capabilities and functions of the music book, and for entering commands for the retrieval of information. The buttons and switches may be of any suitable type such as those used on pocket calculators, mini-computers or the like, and the operation thereof is well known to those familiar with the art.

The principal function of the present invention is that of a storage and retrieval device for musical works. The songs are electronically coded and stored in a memory unit contained in the song book. To recall a song from the memory, the musician issues commands through control panel 46. The lower left hand portion of control panel 46 includes an alphabetical keyboard 50 having a button and switch operated thereby for each letter of the alphabet. The alphabetical keyboard enables the musician to recall from the song book memory an index of alphabetically listed songs contained in the memory which have the sequence of letters entered in the recall command. Each song is listed in the index, together with a code number for the song. The code number is used to directly recall a specific song from the memory. A numerical keyboard 54 is provided for entering the code numbers of a song. The numerical keyboard may consist of separate keys designated 0 through 9, or for reducing the size of control panel 46, some keys may have dual functions, such as, for example, both an alphabetical command function and a numerical command function. To differentiate between the use of a key for its alphabetical function and for its numerical function, "Index" and "Code" keys 56 and 58, respectively, are provided, so that when a key is pressed in a particular command together with an index signal from "Index" key 56 the alphabetical designation and function will prevail. If "Code" key 58 is pressed in a command with a dual function key, the numerical designation and function thereof will prevail. Alternatively, the codes for the songs may be letter codes in which case the numerical designations for keys is not required. Letter keys pressed with the "Index" key will cause the index listing, as described above, to appear; whereas the letter keys used with the "Code" key will recall a specific song from the memory and cause the song to appear on the screen.

Various additional features may be added to the basic song storage and retrieval capabilities of the present electronic music book. An audio playback feature may be included so that a selected song is played with electronically created tones. A "Play" button 64 on control panel 46 activates the electronic playback feature of the music book so that the musician can hear a portion or all of a selected song. This feature is particularly useful for the beginning music student who can often benefit from hearing a song and comparing it with his playing thereof. If the musician desires to hear the song played again, a button 66 designated "Repeat" is used to cause a replay of the last entered song. Speed control of the playback is adjusted by a slide lever 68 operating a variable rheostat. The present electronic music book may be coupled with appropriate adapters to an electric organ or other independent electrical instrument so that the play button, when depressed, will cause the aforementioned independent electrical instrument to play the song selected.

Another feature which may be included in the present electronic music book is particularly advantageous for a musician who composes original musical works. A button 70 designated with the title "Enter" is used when the musician desires to enter a song which is not in the memory of the music book, such as his own composition or any other song. The upper portion of control panel 46 includes a two octave keyboard 72, similar to a portion of a piano keyboard. From keyboard 72, any desired sequence of musical notes can be entered into a temporary memory of the music book, and may be of the musician's original composition or may be a song which the musician desires to temporarily store in the memory of the music book. Pressing "Manual" button 74 will cause the just entered sequence of notes to appear on viewing screen 44, and if the "Play" button is pressed, the just entered composition will automatically be replayed for the musician to hear.

As an addition to the playback feature which may be used for songs in the permanent memory or for songs entered into the temporary memory through musical keyboard 72, a rhythm keyboard 76 is disposed in control panel 46, and is used to expand the playback capabilities of the music book to electronically play background music in various rhythms. In FIG. 4, rhythms of fox trot, swing, blues, rock, polka, samba, bossonova, rhumba and waltz are indicated; however, other rhythms may be used in addition to, or in place of, those indicated. Speed control lever 68 adjusts the speed of both the rhythm and electronic playback features.

Referring now to FIG. 5, a more complete description will be given of the general electronic components which are required for an electronic music book having all of the optional capabilities described above. The components will be familiar to those skilled in the art and an in depth description thereof is not required. Those skilled in the art will realize that different types of specific electronic devices may be used to meet the requirements of, and to perform the functions of, a general component to be described. Some of the components are not required if certain optional features are eliminated from the electronic music book. The familiar abbreviated terms for the components are given in parentheses.

The central component of the electronic music book, as with most conventional miniature computer-like devices, is a microprocessor 80 or a central processing unit (CPU) to which the other components are linked by a main power and signal connector 82. Control panel 46 is hooked to the main power connector 82 through a keyboard encoder 84. Viewing screen 44, on which the selected musical composition and the portions of the index from the musical memory are displayed, is operated from the CPU. The video display memory from the CPU enters a video display random access memory buffer 86 (DMA) which reads the memory signals from the CPU and generates the required video output through display circuitry 88. A speaker 90 is connected to the CPU by audio circuitry 92 to accommodate the electronic playback feature of the invention. As those skilled in the art will understand, a suitable audio circuit 92 will include a memory mapped bank of phase locked loop (PLL) devices to yield the complex audio output for music generation. An earphone jack 93 may also be provided to cancel the audio signal to speaker 90 and provide private audio monitoring through an earphone. The music output speed is controlled by a timing network 94 having a capacitor and variable resistor to provide a timed beat for determining the speed of all music output associated with the playback feature of the present invention. The songs and index permanently contained in the music book are stored in coded form in a standard song and index memory (EPROM) 96 from which they can be recalled at any time through the operation of control panel 46. To record the original composition or other operator input signals entered through musical keyboard 72, a dynamic random access memory (RAM) 98 is provided. This memory receives and stores the information entered through the musical keyboard, and retains the information as long as the music book is turned on. When the electronic music book is turned off, the temporary memory of RAM 98 is cleared. An optional read-only memory module 100 is provided so that the user of the electronic music book can purchase additional songs coded and stored in the modules and can interchange the optional modules to select various songs. A monitor program read-only memory 102 is provided for controlling all aspects of the control circuitry. Power for the operation of the electronic components is provided from a power supply source 104, which in the preferred embodiment will include batteries for portable operation and an AC adapter input 106 for use when the portable batteries are drained, or when the electronic music book is to be permanently installed, such as, for example, on a piano or organ.

In the use and operation of an electronic music book embodying the present invention, a basic library of songs is permanently stored in the standard song and index memory (EPROM) 96. The memory may be stored with a basic collection of any general category of songs such as for example western, classical, disco or the like, or with a combination thereof. Additional songs can be added to the standard memory by interchanging optional modules 100. The electronic music book can be attached either to a free standing music stand or to the rack or music sheet holder on a piano or organ by sliding retaining clips 34 and 36 over the backrest of the music stand. If the music book is to be used portably, or for a temporary time, batteries are inserted into the power source 104. For permanent installation it is preferred that an electric cord be attached to AC adapter 106.

When the musician desires to recall a song from the memory, "On" button 60 is pressed. If at least a portion of the title of the song is known, the first three letters of the song are entered by pressing the appropriate buttons of the alphabetical keyboard 50, and "Index" button 56 is pressed, at which time songs that start with the three letters entered will appear on the screen, each song having an appropriate code number following the song title. This information is all stored in either the standard song and index memory (EPROM) 96 or the optional module 100. When the desired song is located "Code" button 58 is pressed followed by pressing the appropriate buttons for the code number. The desired song will then appear on screen 44 exactly as it would appear in a fake music book with melody line, key signature, chord signs and words.

The musician, having now obtained the desired song, can do any of several things. He can play the song on his own musical instrument, he can use musical keyboard 72 of the electronic music book to play the song, or, by pressing "Play" button 64, the musician can hear the song automatically played through audiocircuit 92 and speaker 90. Use of an earphone connected to optional earphone jack 93 will cancel the audio signal to speaker 90 and provide private listening through the earphone. The speed of the playback can be adjusted through movement of lever 68 to control timing network 94. If the musician desires to hear the song with an accompanying rhythm he can press any of the keys in rhythm keyboard 76 for the desired rhythm. If he wishes to hear the song played again he may do so by pressing "Repeat" button 66. Independent electrical instruments, such as organs, can readily be attached to the music book with appropriate adapter circuitry so that the song being displayed may be played on the electric instrument, with all the capabilities thereof available.

If the musician desires to compose his own song, or desires to temporarily enter a song into the memory of the music book, "Enter" button 70 is pressed. The composition is then played on musical keyboard 72 and is stored in the temporary memory of dynamic song RAM 98. By pressing "Manual" button 74 the just entered composition will be displayed on viewing screen 44, and if the "Play" button is pressed the song will automatically be replayed through the audiocircuitry, at which time speed control and rhythm adjustments can be made.

Simplified embodiments of the electronic music book can be made which have only the indexing and display features for songs. Hence, the musical keyboard 72 and the recording features may be eliminated, and in the simplest embodiments rhythm keyboard 76 and audio playback features may also be eliminated, so that the electronic music book is merely a storage and retrieval system for written music. A musician can store and readily retrieve a great number of songs in the standard song and index memory 96 alone, and with optional modules 100 can greatly increase his library of musical songs, yet will have little or no storage problem, as the optional modules will be quite small even though they may contain hundreds of songs.

Although one embodiment of an electronic music book has been shown and described in detail herein, various changes may be made without departing from the scope of the present invention.

I claim:

1. A music book comprising a memory means for storing a plurality of electronically coded musical scores and for storing a list of song titles for said scores in alphabetical sequence together with a code reference for each title, means for translating and for displaying said coded musical scores and said song title and code list in readable forms, indexing means for selecting a single score from said plurality of stored electronically coded musical scores, said indexing means including an alphabetical keyboard for entering at least a portion of the title of a desired score as a memory recall command for said song title and code list and a code character keyboard for entering the code reference of the desired score, a central processing and data communications means interconnecting said memory, translating and display means and said keyboards for causing a display of song titles beginning with the letters entered through said alphabetical keyboard and for causing said desired score to be displayed in response to a code entry through said code character keyboard, and a power means for operating said aforementioned means.

2. A music book as defined in claim 1 in which said memory means includes a replaceable module for changing the songs retrievable from said memory means.

3. A music book as defined in claim 2 in which an audio circuit having a speaker means is disposed in said music book for playing a song selected from said memory means.

4. A music book as defined in claim 3 in which a means is provided for selecting and playing a rhythm accompaniment for the music being played through said audio circuit.

5. A music book as defined in claim 4 in which a musical note input means is provided for creating electronic signals to correspond with selected musical notes, and said memory means includes a means for recording said electronic signals entered through said input means as a musical composition.

6. A music book as defined in claim 5 in which a speed control means is provided for said audio circuit.

7. A music book as defined in claim 6 in which a housing adapted to be attached to a music stand encloses all of said means.

8. A music book as defined in claim 1 in which an audio circuit having a speaker means is disposed in said book for playing a song selected from said memory means.

9. A music book as defined in claim 8 in which a means is provided for selecting and playing a rhythm accompaniment for the music being played through said audio circuit.

10. A music book as defined in claim 1 in which a musical note input means is provided for creating electronic signals corresponding to selected musical notes, and said memory means includes a means for recording said electronic signals as a musical composition.

11. A music book as defined in claim 1 in which a housing adapted to be attached to a music stand encloses all of said means.

* * * * *